United States Patent [19]
Woolfson et al.

[11] 3,829,747
[45] Aug. 13, 1974

[54] CONTROL SYSTEM FOR SYNCHRONOUS MOTOR

[75] Inventors: Martin G. Woolfson, Baltimore; Gilbert H. Frank, Columbia, both of Md.

[73] Assignee: Westinghouse Electric Corporation, Pittsburgh, Pa.

[22] Filed: Mar. 22, 1973

[21] Appl. No.: 343,708

[52] U.S. Cl.................. 318/175, 318/184, 318/314
[51] Int. Cl. ............................................ H02p 7/36
[58] Field of Search .......... 318/175, 184, 313, 314, 318/318, 603

[56] References Cited
UNITED STATES PATENTS

| | | | |
|---|---|---|---|
| 3,268,788 | 8/1966 | Branco | 318/313 X |
| 3,288,923 | 11/1966 | Arimura et al. | 318/175 X |
| 3,330,149 | 7/1967 | Scott, Jr. | 318/313 X |
| 3,514,685 | 5/1970 | Burgess | 318/313 X |
| 3,553,555 | 1/1971 | Morris et al. | 318/314 |
| 3,663,880 | 5/1972 | Gabor | 318/603 |

Primary Examiner—Gene Z. Rubinson
Attorney, Agent, or Firm—J. B. Hinson

[57] ABSTRACT

A synchronous motor control system achieves an increase in motor damping by electronic means. Additional circuitry is employed in the motor drive electronics to respond to disturbances in load torque occurring on the motor shaft and to introduce a selected amount of phase modulation to the motor drive signal for compensation. An encoder wheel attached to the motor shaft and encoder electronics derive a signal corresponding in frequency to the rotation of the motor shaft. A phase detector circuit continuously measures the phase difference between the motor drive signal frequency and the motor shaft encoded frequency. Through a process of filtering and differentiation, the time rate of change in phase difference is measured, and the resulting electrical voltage equivalent of phase change is made input for phase modulation to the motor drive circuitry. By proper selection of circuit constants, a state of critical damping of motor oscillations for torque disturbances on the motor shaft is achieved.

10 Claims, 15 Drawing Figures

CONTROL SYSTEM FOR SYNCHRONOUS MOTOR

BACKGROUND OF THE INVENTION

1. Field of the Invention

This invention relates to control of synchronous motors and in particular to control of synchronous motor damping through electronic means.

2. State of the Prior Art

In many motor driven devices, such as for example, electro-mechanical scanners, tape recorder drives, etc., the precise control of motor shaft speed is a prime requirement. The synchronous motor is an ideal candidate for the basic drive in these applications since the long term average speed is as stable as the frequency source providing power to the motor. In the short term, however, "wow" and "flutter" effects are often noted due to load disturbance torques which produce accelerations in shaft speed. The synchronous motor control characteristic has a characteristically low damping factor. As a consequence, impulse torque disturbances produce lightly damped shaft speed oscillations that persist for a relatively long time. To reduce oscillations, mechanical damping techniques or additional motor windings are used. The amount of damping to be introduced for a given load torque disturbance is determined by sensing motor shaft rotation and changes thereto caused by the disturbance. Mechanical methods seek to change the total mass-inertia of the motor rotor, shaft and load such that demands for an energy increase in the motor system are met with an increase in total mass-inertia and vice versa. The amount of mass-inertia change must follow the restrictions imposed by the differential equations of motion for the motor system, otherwise the mechanical compensation itself can cause unstable motor operation. Ideal compensation is realized for conditions of critical damping. In contrast to mechanical means, additional motor winding methods seek to compensate for load torque disturbances by altering the electrical energy of the motor system. Again, the amount of electrical energy introduced in the magnetic fields of the motor must follow the restrictions of the equations of motion for the motor to achieve damping. For both mechanical and motor winding approaches, the particular implementation of damping is unique for a given motor and is not readily adaptable to other motors of different construction and motor-torque ratings.

SUMMARY OF THE INVENTION

It is therefore an object of this invention to provide a new and improved motor control system for effectively damping load perturbations imposed upon a synchronous motor.

It is a further object of this invention to provide a control loop for a synchronous motor including circuitry for applying critical damping electronically to the synchronous motor whereby load perturbations are rapidly attenuated.

In accordance with these and other objects, this invention provides a control system for a synchronous motor in the form of a control loop comprising a speed indicating device or encoder coupled to the shaft of the synchronous motor for providing an output signal indicative of motor shaft speed, a source of a reference drive signal, a phase detector responsive to the reference drive signal and the shaft speed signal for providing an output signal representative of the phase difference therebetween, a differentiator for differentiating the phase difference signal to provide an indication of the rate of change of phase difference and a phase modulator for modulating the reference drive signal in a manner inverse to the rate of change of the phase difference to provide a drive signal to be applied to the synchronous motor. Illustratively, a phase shift circuit is provided for shifting the output of the phase modulator 90° to provide in-phase and quadrature signals to be applied to the synchronous motor.

In an illustrative embodiment of this invention, the speed indicating device or encoder comprises an encoding disc for providing a plurality of $m$ impulses for each shaft rotation. Thus, if the synchronous motor includes $n$ number of motor poles equal to $2m$, the frequency of the speed indicating device is then made equal to the frequency of the reference drive signal.

Further, the phase modulator effects the phase modulation of the reference drive signal according to the product of the rate of change of the phase difference and a parameter K1 determined by the gain of the control loop, which is made equal to $2/K/J$, where K is the torque constant of the synchronous motor and J is the load inertia applied to the synchronous motor.

BRIEF DESCRIPTION OF THE DRAWINGS

These and other objects and advantages of the present invention will become more apparent by referring to the following detailed description and the accompanying drawings, in which:

FIGS. 10A to O show the timing of the signals occurring in the circuitry of the phase detector of FIG. 9;

DESCRIPTION OF THE PREFERRED EMBODIMENTS

A synchronous motor is driven by two signals in quadrature phase relationship. If the drive frequency is $f$ and the motor has $n$ poles, then the shaft speed $S = 2f/n$ rps. Operating in the synchronous mode, the long term average speed is as stable as the frequency source driving the motor. In the short term, however, disturbance torques produce accelerations in shaft speed.

Shaft motion is indicated by an encoder attached to the shaft. The encoder precisely divides one complete shaft rotation into $m$ equal parts. Hence, if the shaft speed is S, then the frequency at the encoder output is $f_e = m S$. Suppose $m$ was chosen so that it equaled half the number of poles, i.e., $m = n/2$, then $f_e = f$. In addition, some phase angle $\theta$ would exist between the drive signal and the signal generated by the encoder. In the absence of external disturbances, this angle would remain fixed. The effect of a cyclic torque variation at the motor shaft is a cyclic phase variation between the fixed frequency reference signal driving the motor and the signal generated by the encoder. Relating the phase variations to the motor shaft, the phase variation in the encoder output signal would be m times the phase variation of the motor shaft. For the synchronous motor, some lag angle exists between the rotating electrical field and the mechanical rotation of the motor shaft. The angle assumes some value so that the net torque produced will be sufficient to overcome the load friction torque. Variations in this torque value require that a different angle be assumed and, through the motor dynamics, produce a phase perturbation. Without any form of compensation, the shaft undergoes a lightly damped oscillation which finally approaches some value. Suppose some angle on the shaft was taken as a reference position. This point, for example, might correspond to a given edge of one of the encoder markings. The phase perturbation noted above would be manifested as a "jitter" in the apparent cycle to cycle position of the encoder output. Low frequency components of this variation are termed "wow" while high frequency components are termed "flutter."

The method of the invention to improve motor characteristics is to increase the effective or inherent damping of the motor itself. The approach taken in the invention is an electronic one which operates in conjunction with the motor drive electronics and requires no additional motor windings. Circuitry includes a motor shaft encoder, encoder-signal differentiator, motor drive-signal phase modulator and drive signal amplifiers. The encoder produces a signal equal in frequency to a reference drive signal when the motor is rotating at synchronous speed. For operation of FIG. 1, it is necessary to provide an encoder which will produce a frequency equal to the reference clock when the motor is turning at its synchronous speed. The differentiator gain and compensation must also be adjusted for optimum results. Dividing logic may also be inserted between the reference clock and the phase detector as long as the inputs to the phase detector are at the same frequency.

Circuit operation begins when there is a phase change between the reference and the encoder due to a load disturbance. This changes the phase detector output which is reflected in differentiator output. The average value of the phase detector output is not important, only the change is considered and this is the input to the phase modulator. A low pass filter is used to remove the reference drive frequency carrier from the phase detector output. The phase modulator operates as a mono-stable, multi-vibrator, the on time of which is dependent on circuit constants and is proportional to the instantaneous phase shift.

The output of the phase modulator is a waveform equal in frequency to the reference clock divided by the number of motor pole pairs but with the leading edge shifted in phase with respect to it. This is employed along with a waveform shifted 90° from it to drive the motor and damping is supplied by the shifted leading edge of both waveforms.

Figure 1:
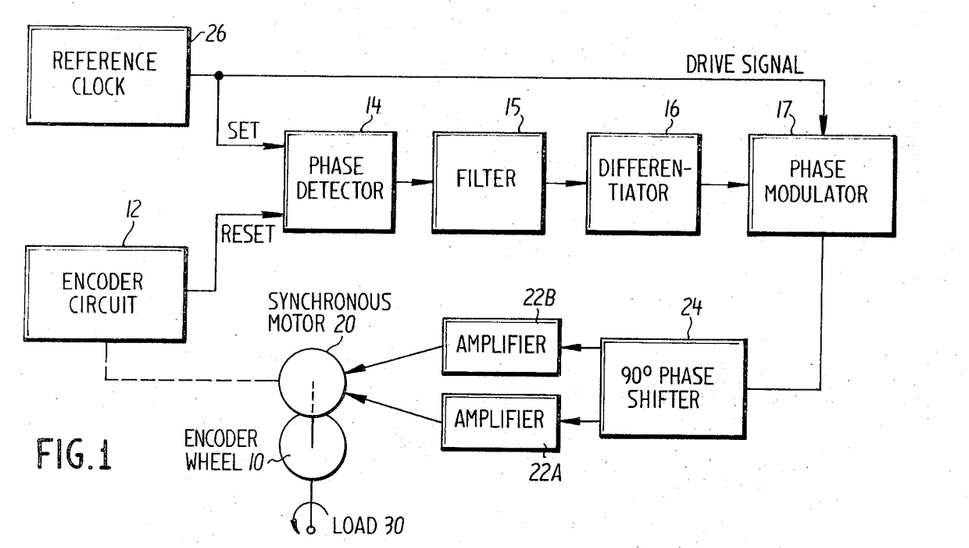
FIG. 1 is a block diagram of the synchronous motor system showing the major elements required in the electronic circuitry of this invention.

With reference to the drawings and in particular to FIG. 1, a block diagram of a specific embodiment of the invention is given. It comprises a shaft encoder wheel 10, an encoder circuit 12, phase detector 14, low pass filter 15, differentiator 16 and phase modulator 17. Also shown are synchronous motor 20, drive amplifiers 22A and 22B, 90° phase shifter 24 and reference clock source 26. The encoder wheel 10 is fixed to the shaft of the synchronous motor 20 and rotates with the shaft which in turn drives a LOAD 30. The encoder wheel has affixed thereto markings or apertures arranged in a geometric relationship such that there are "$m$" number of sectors to the encoder wheel 10. The number "$m$" is chosen to equal one-half the number of poles "$n$" of the motor 20. Motor shaft rotation is then measured employing the encoder wheel 10 and an encoder circuit 12, as more fully illustrated in FIG. 2.

Figure 2:
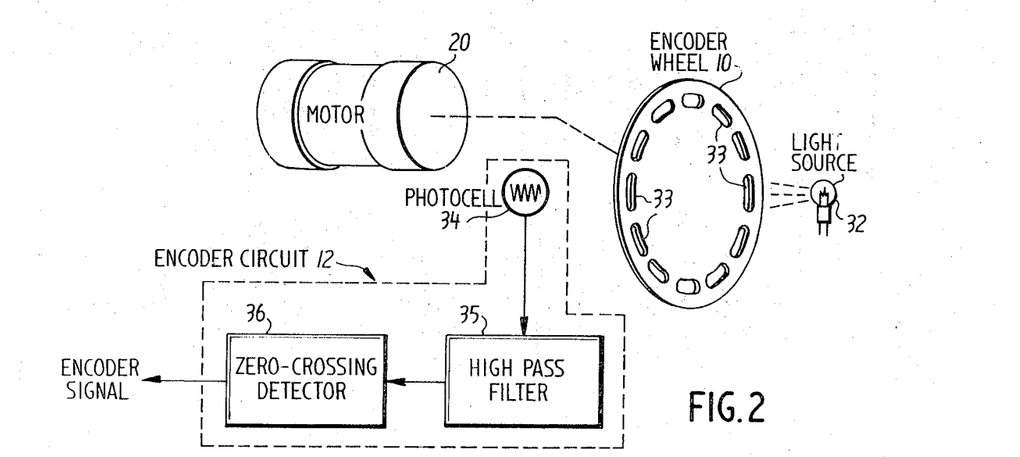
FIG. 2 shows the encoder wheel whose output is applied to suitable circuits for producing the encoder signal.
Figure 3:
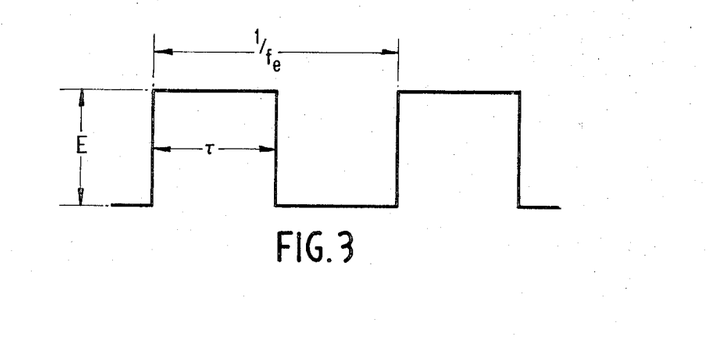
FIG. 3 shows the waveform of the encoder signal signal as derived from the circuits of FIG. 2.

In FIG. 2, light source 32 emits light which passes through apertures 33 in the encoder wheel 10, to be sensed by photo-cell 34. In an illustrative embodiment, the encoder wheel 10 comprises a slotted aluminum disc, also used for adding inertia to the motor shaft. The wheel inertia was designed to be 0.4 oz-in-sec$^2$ which, in addition to the motor rotor assembly, approximates the system inertia. The alternating passing and interrupting of light caused by the rotation of the encoder wheel 10 produces a corresponding electrical signal in the output of the photo-cell 34. The photo-cell output is applied to a high pass filter 35, which removes the direct current component of the photo-cell 34 and the filtered output is applied to a zero-crossing detector 36. The output of the zero-crossing detector 36 is a signal having a waveform as shown in FIG. 3, where "T" corresponds to the on-time of the photo-cell 34 and $1/f_e$ corresponds to the period of time required for the rotation of successive encoder wheel apertures past the photo-cell 34. For a shaft speed "S" and "$m$" equally spaced apertures on the encoder wheel 10, the frequency at the output of the zero-crossing detector 36 is $f_e = mS$. The shaft speed "S" is related to the frequency of the motor drive signal $f$ and and number of motor poles "$n$" by the equation $S = 2f/n$; thus where $M = n/2$ it can be seen that $f_e = f$, i.e., the frequency of the encoder signal equals the frequency of the motor drive signals.

Figure 4:
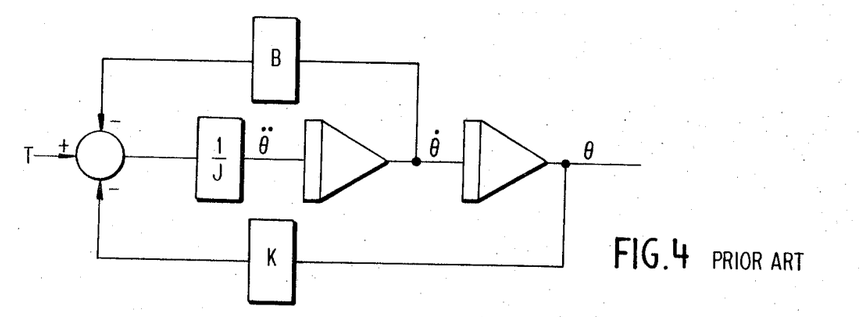
FIG. 4 is the state diagram of an uncompensated synchronous motor of the prior art.

In practice, a phase angle exists between the drive frequency $f$ and the signal $f_e$ generated by the encoder. In the absence of external torque disturbances on the motor shaft, the phase angle remains constant. When torque disturbances are introduced by the load on the motor shaft, a cyclic phase variation is established between the fixed drive frequency $f$ and the frequency $fe$ of the signal generated by the encoder. Relating the phase variations to the motor shaft, the phase variations in the output signal encoder circuit 12 are $m$ times the phase variations of the motor shaft. For the synchronous motor such as motor 20 some phase angle or lag angle exists between the frequency of the rotating electrical field corresponding to the frequency $f$ of the drive signal and the mechanical rotation of the motor shaft. The angle assumes some value so that the net torque produced by the motor will be sufficient to overcome the load friction torque. The equation of motion for the equivalent spring mass system of the motor operating at synchronous speed "S" is given by:

$$\ddot{\theta} = T/J - B/J\,\dot{\theta} - K/J\,\theta \qquad (1)$$

where
 $T$ = load torque, oz-in
 $J$ = load inertia, oz-in-sec$^2$
 $B$ = motor damping, oz-in/rad/Sec
 $K$ = motor torque constant, oz-in/rad
 $\theta$ = lag angle, rad
 $\dot{\theta}$ = first time derivative of lag angle, rad/sec.
 $\ddot{\theta}$ = second time derivative of lag angle, rad/sec$^2$
The state model for this equation is given in FIG. 4.

Figure 5:
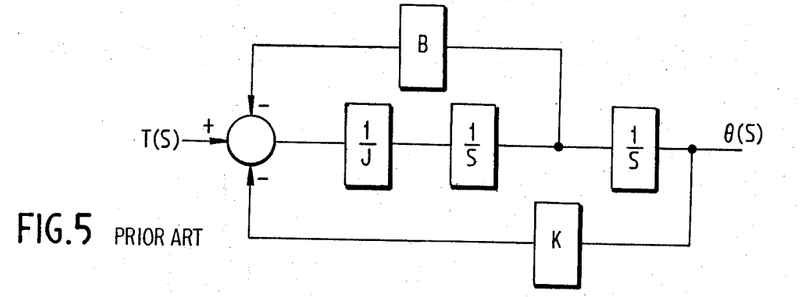
FIG. 5 is the transfer function diagram of an uncompensated synchronous motor of the prior art.

The state model in terms of Laplace transforms, less initial conditions, is represented by the transfer function diagram of FIG. 5. Employing Laplace terminology, the state model of FIG. 5 is expressed as the following transfer function:

$$\theta(s) = \frac{T(s)/J}{s^2 + \frac{Bs}{J} + \frac{K}{J}} \qquad (2)$$

For example, if $T(S)$ is an impulse torque $T_0$ at time zero, equation (2) is solved in the time domain yielding:

$$\theta_t = \frac{T_0}{J} \cdot \frac{e^{-[\frac{B}{2J}t]}}{\sqrt{\frac{Jt}{J} - \frac{B^2}{4J^2}}} \cdot \sin\left(\sqrt{\frac{K}{J} - \frac{B^2}{4J^2}}\right)_t \qquad (3)$$

The resonant frequency of the motor is given in the sin $W_n t$ term, where the resonant frequency "$W_n$" is expressed by:

$$W_n = \sqrt{\frac{K}{J} - \frac{B^2}{4J^2}} \qquad (4)$$

For the typical synchronous motor, the damping factor $B$ is quite small compared to the load inertia $J$, so that its resonant frequency "$fn$" is very nearly equal to:

$$f_n = W_n/2\pi = 1/2\pi - \sqrt{K/J} \qquad (5)$$

Figure 6:
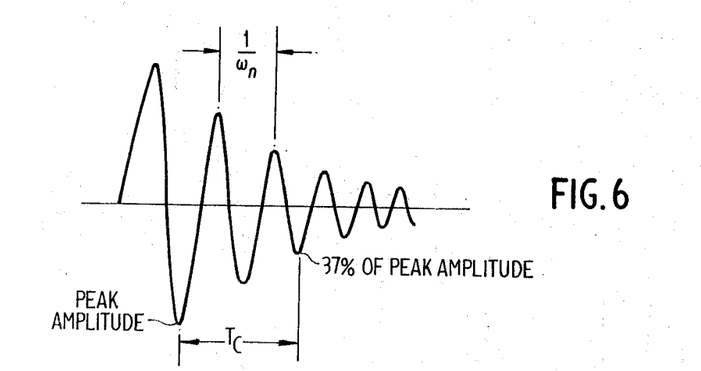
FIG. 6 shows the waveform produced at the filtered output of the phase detector for an uncompensated synchronous motor experiencing a load torque disturbance.

Furthermore, with a high load inertia, the time constant $2J/B$ of the exponential term is quite large, and the exponential damping of the sinusoid, and hence motor oscillation, persists for a relatively long time. Typical load torque disturbances may be characterized by random time occurrence impulse torques so that the above equations (3), (4), and (5) correctly describe the character of the synchronous motor system. FIG. 6 illustrates the damped oscillations which would appear in the filtered output of the phase detector. The frequency of oscillation fn is given in equation (5), and the time constant equal to $2J/B$ is measured from the time of the peak amplitude of oscillation to the time of oscillation when the amplitude is 37 percent of the peak value, as illustrated in FIG. 6.

Figure 7:
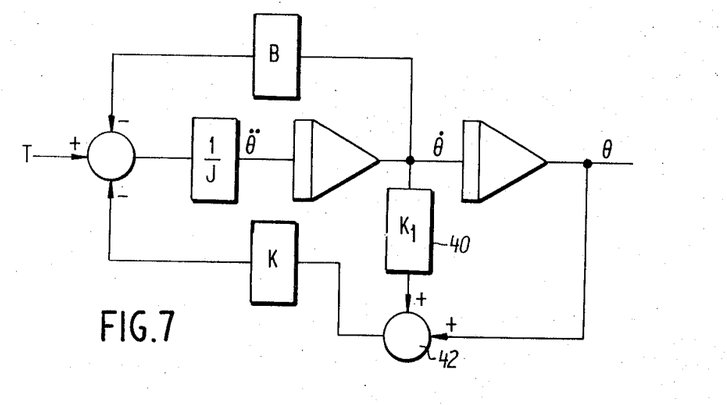
FIG. 7 is the state diagram of the synchronous motor system employing increased effective damping in accordance with this invention.
Figure 8:
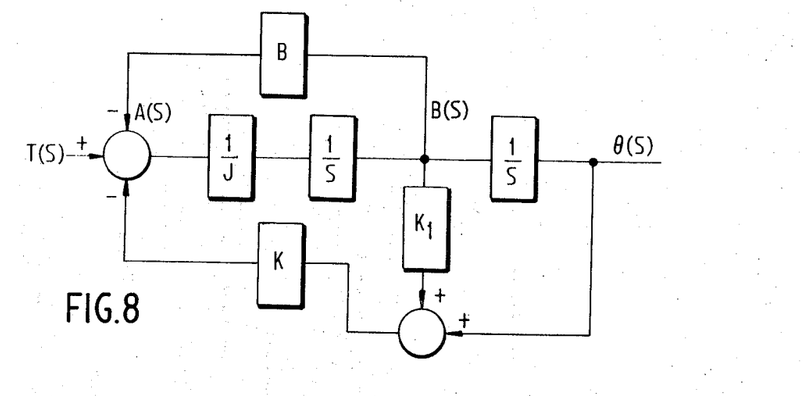
FIG. 8 is the transfer function diagram of the synchronous motor system employing increased effective damping.

In accordance with the teaching of this invention, the effective damping of the synchronous motor system is increased by electronic means. The method of the invention is best explained by incorporating suitable variations in the system model as shown in FIG. 7. In FIG. 7, the new elements are a term K, introduced by block 40 and a summing point 42. The corresponding transfer function diagram is given in FIG. 8. The transfer function of the diagram is as follows:

$$\theta(s) = \frac{T(s)/J}{S^2 + \frac{(B + K_1 K)}{J} S + \frac{K}{J}} \qquad (6)$$

The effective damping factor of the synchronous motor system now becomes $(B + K_1 K)$ instead of just B as shown previously in equation (2).

From servomechanism theory, it is known that the best damping compensation is realized at the critical damping level. The theory requires that the denominator of equation (6) have equal and real roots as expressed by the following:

$$S^2 + B + K_1 K/J\, S + K/J = [S + \sqrt{K/J}]^2 \qquad (7)$$

From which, $$K_1 = 2\sqrt{KJ} - B/K \qquad (8)$$

Since $J$ is much larger than B, equation (8) is correctly approximated as:

$$K_1 = 2/\sqrt{K/J} \qquad (9)$$

with the units of $K_1$ being seconds.

Figure 9:
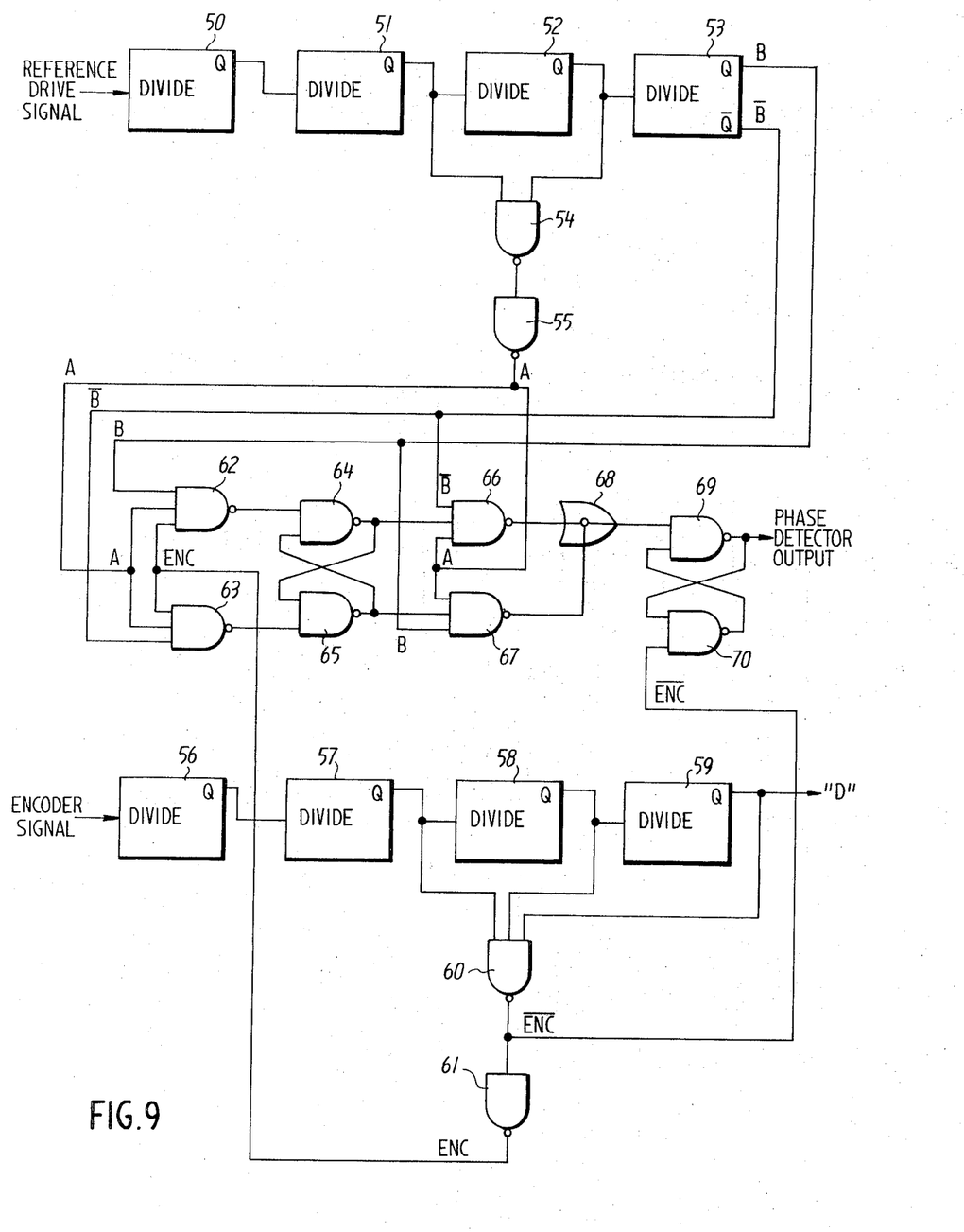
FIG. 9 is the logic circuitry diagram of the phase detector which receives the reference drive signal and encoder signal and derives the waveform shown in FIG. 3.
Figure 10:
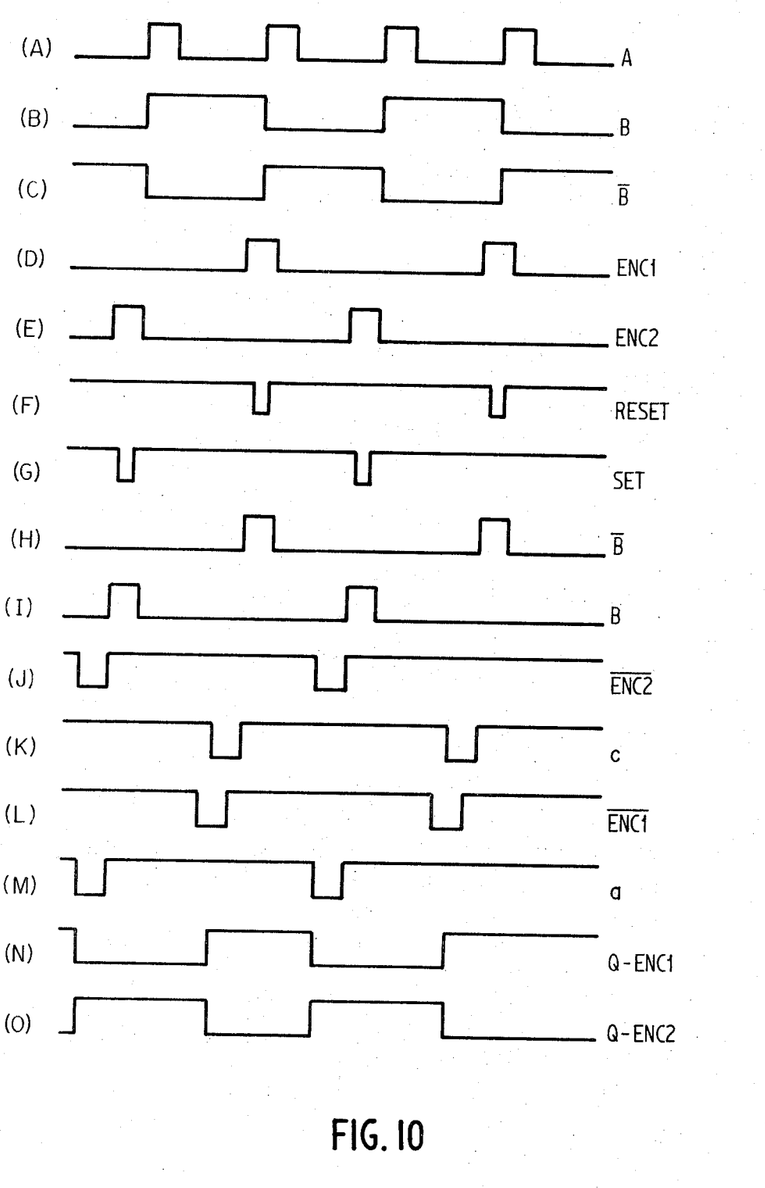

Referring to FIGS. 7 and 8, the required signal input to the block $K_1$ is the first derivative, $\dot{\theta}$ of the lag angle $\theta$, as derived from a phase detector 14, low pass filter 15, and differentiator 16 as shown in FIG. 1. The phase detector is explained in more detail referring to FIGS. 9 and 10. A reference signal is divided in frequency by 16 in divide by two circuits 50, 51, 52 and 53 to produce signals B and $\bar{B}$. The NAND gate 54 receives the outputs of the second divide by two circuit 51 and its output is applied to the inverter 55 to produce signal A. The timing relationship of signals B, $\bar{B}$ and A is shown in FIG. 10. The encoder signal, is likewise divided in frequency by sixteen divide by two circuits 56, 57, 58 and 59. The NAND gate 60 receives the outputs of the second divide by two circuit 57, the third divide by two circuit 58 and the fourth divide by two circuit 59. The output of the NAND gate 60 produces signal $\overline{ENC}$ and is made input to the inverter 61 which in turn produces signal ENC. The signal ENC (and $\overline{ENC}$) is shown in FIGS. 10 D, E, J and L as ENC1 (and $\overline{ENC1}$) and ENC2 (and $\overline{ENC\ 2}$) illustrating respectively encoder output signals having either of these phase relationships with respect to the reference signals B and $\overline{B}$. Thus, as seen in these figures, the system is operative regardless of the relative phase relation between the signals ENC and B. The NAND gate 62 receives signals A, B and ENC, and the NAND gate 63 receives signals A, $\overline{B}$ and ENC. The NAND gate 64, cross coupled to the NAND gate 65, receives the output of the previous NAND gate 62, and the NAND gate 65 receives the output of the previous NAND gate 63. The NAND gate 66 receives the output of NAND gate 64 in addition to signals A and $\overline{B}$. The NAND gate 67 receives the output of the previous NAND gate 65 in addition to signals A and B. The outputs of the NAND gate 66 and 67 are wired -NOR as shown by the numeral 68 and applied to the NAND gate 69 which is cross coupled to the NAND gate 70. The NAND gate 70 receives signal $\overline{ENC}$ as an input. The output of the NAND gate 69 produces the PHASE DETECTOR OUTPUT signal. The timing relationship of the above signals is given in FIG. 10. Since the phase relationship between the encoder and reference inputs is somewhat arbitrary, the circuit of FIG. 9 is configured so that the duty cycle cannot be zero or 100 percent. This is accomplished by decoding two reference signals B and $\overline{B}$ which are 180° out of phase. Coincidence of the encoder output with one of the signals B and $\overline{B}$ automatically selects the other as a reference signal. The phase detector produces a pulse width variable signal which is a measure of the phase difference between the reference drive signal and the encoder output signal. In the phase detector, a latch comprised of cross coupled NAND gates 69 and 70 is set with the reference signal and and reset by the encoder output signal. The occurrence of the set and reset pulses is shown as waveforms SET and RESET in FIGS. 10F and G. For a time difference in the pulses of the SET and RESET waveforms equal to $\tau$ and a reference signal of $f$, the phase angle $\phi$ measured between the reference and encoder signals is:

$$\phi = 2\pi f \tau \tag{10}$$

The voltage waveform of the output of the phase detector is shown in FIG. 3, where E is the voltage change in the output of the NAND gate 69. The average value of the waveform Eo is found from $$Eo = E\tau f$$

which, recalling that $f = mS$, becomes $$Eo = E\tau mS \tag{11}$$

It is noted then that the measure of phase difference occurs at "m" times the lag angle $\theta$ of the motor shaft. The phase detector output is coupled to a low pass filter 15, as shown in FIG. 1, to recover the average value.

Figure 11:
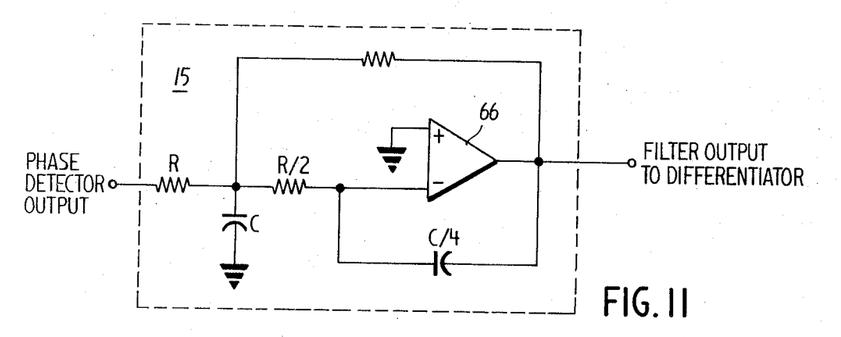
FIG. 11 shows the circuitry used in the low pass filter block of FIG. 1.

An illustrative embodiment of the low pass filter is shown in FIG. 11 as including a two pole Butterworth filter and is used to extract the average value of the phase detector output. In FIG. 11, an operational amplifier 66 is operated in conjunction with resistors of R and R/2 accordingly and capacitors C and C/4 accordingly, where R is a value in ohms and C a value in farads. The transfer function G(S) for the filter of FIG. 11 is as follows:

$$G(S) = \frac{-1}{\frac{R^2C^2}{8}S^2 + \frac{RC}{2}S + 1} \tag{12}$$

for a cut-off frequency of Wo, let $$Wo = 2\sqrt{2}/RC \tag{13}$$

The low pass characteristics of the filter is expressed then as:

$$|G(jw)| = \frac{1}{\left[1 + \left(\frac{w}{Wo}\right)^4\right]^{1/2}} \tag{14}$$

The filter component is identified by numeral 15 in FIG. 1.

Figure 12:
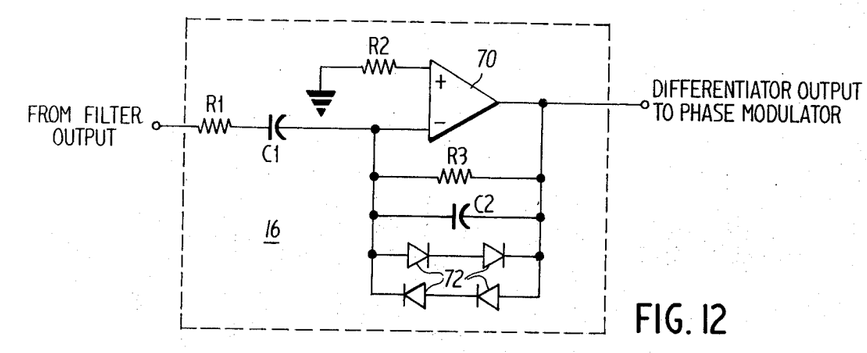
FIG. 12 shows the circuitry used in the differentiator block of FIG. 1.

The differentiator circuit 16 of FIG. 1 is detailed in FIG. 12. In the figure, the operational amplifier 70 is operated in conjunction with resistors $R_1$ and $R_2$ and capacitors $C_1$ and $C_2$ as shown. Diodes 72 limit the voltage input to the phase modulator to +1.2 volts. The transfer function $G_D(S)$ for the differentiator circuit 16 is:

$$G_D(S) = -R_2C_1S/(1 + R_1C_1S)(1 + R_2C_2S) \tag{15}$$

Resistor value $R_1$ and capacitor value $C_2$ are chosen so that the same cut-off frequency Wo obtains as for the filter circuit 15:

$$1/R_1C_1 = 1/R_2C_2 = Wo \tag{16}$$

The resulting transfer function is then:

$$G_D(S) = \frac{-R_2C_1S}{\left(1 + \frac{S}{Wo}\right)^2} \tag{17}$$

Figure 13:
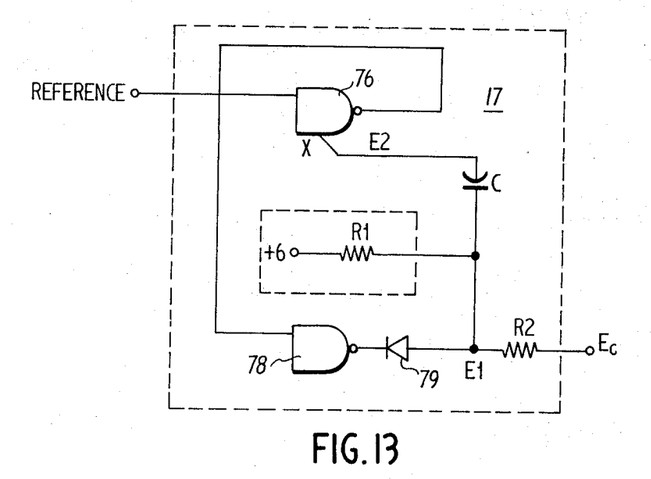
FIG. 13 shows the circuitry used in the phase modulator block of FIG. 1.

The phase modulator 17 of FIG. 1 is explained in more detail referring to FIG. 13. In the figure, an inverter 76 receives the reference drive signal. Point X on the inverter 76 is the junction point of an input to a transistor base and a resistor within the inverter integrated circuit, pulled-up to the supply voltage of +6 volts. The second inverter 78 receives the output of the first inverter 76 and its output is connected to the diode 79 which in turn is connected to the junction $E_1$. The inverters 76 and 78 operate in conjunction with resistors $R_1$ and $R_2$, capacitor C and the diode 79 as a voltage variable monostable multivibrator, which produces a time delay Td in accordance with the control voltage $E_C$ which is the output of differentiator 16 in FIG. 1. Note that the time delay Td produced by the monostable multivibrator is the length of time introduced as a delay to the change of state of the inverter 76 and as such provides the required phase modulation to the reference drive signal.

Figure 15:
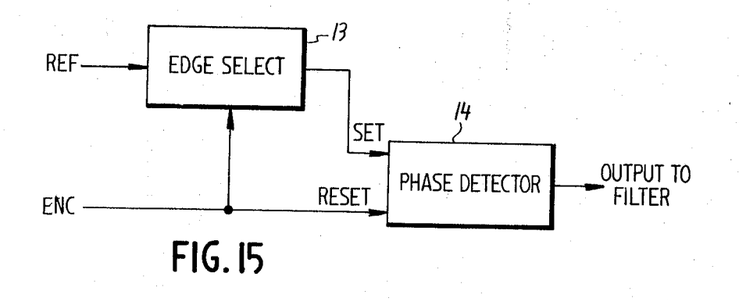
FIG. 15 is a schematic representation of an alternative embodiment of the phase encoder to be incorporated into the system of FIG. 1.

Several modifications are provided to the system described above to produce better results. The most impressive embodiment (as shown in FIG. 15) in terms of performance is the use of a reference drive signal to be applied to the phase detector 14' and having a frequency about one hundred times the natural frequency of the synchronous motor. The use of a higher frequency carrier increases the phase gain of the detector and also provides better noise immunity by separation of carrier and data. This causes a problem when the load changes are large which is seen as the phase detector output increasing to its maximum and then going to zero before increasing instead of staying in a linear range. The circuit now in operation uses an edge selection process including an edge select circuit 13 in order to overcome this difficulty, as shown in FIG. 15. The edge select 13 is used to insure that the SET signal will be high when the trailing edge of the $\overline{RESET}$ wave form occurs. This is done by providing REF or $\overline{REF}$ (derived as shown in FIG. 9) at the SET terminal, depending upon the state of ENC.

Referring again to FIG. 1, the output of the phase modulator 17 is made into two drive signal components displaced in phase by 90° by the operation of the 90° phase shifter 24. Each of the two drive signals is amplified by amplifiers 22A and 22B to provide the required electrical energy for driving the synchronous motor 20.

Figure 14:
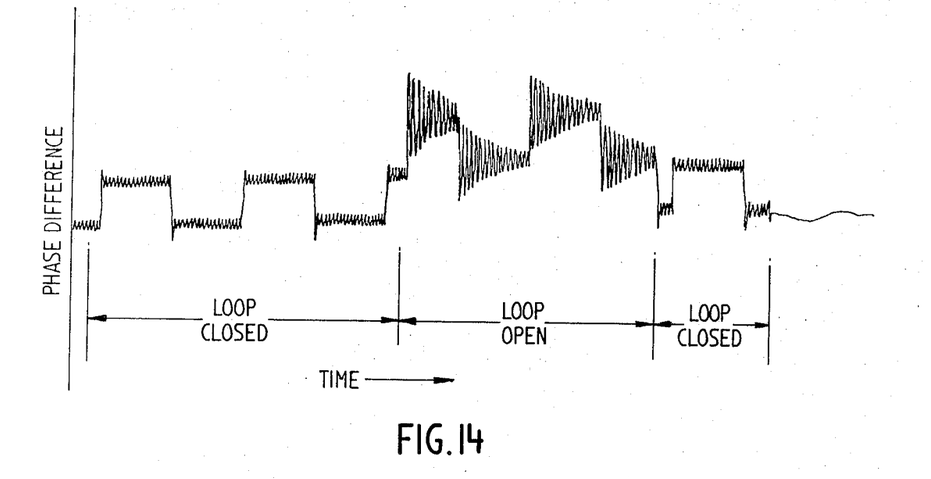
FIG. 14 is a reproduction of a chart recording showing the performance of the synchronous motor system

Results obtained from the increased damping are impressive as can be seen in FIG. 14. The chart recording of the figure is the output of the low pass filter 15 as shown in FIG. 1. The torque disturbances to the synchronous motor 20 were produced by summing a square wave into the phase modulator 17. To achieve the open loop mode, the output of the differentiator 16 was shorted. In FIG. 14, the resultant phase difference for a step change in applied torque is illustrated for the open loop, i.e. normal damping, and closed loop modes, i.e., damping provided by the control loop of this invention. In the closed loop mode, the phase difference rapidly attenuates after a small, initial peak to a condition where only system noise is present. In the open loop condition, the phase difference assumes initially a significantly longer variation and attenuates exponentially at a rather slow rate.

The high frequency or "flutter" response of the electronically damped synchronous motor system is determined by considering the motor drive signals to be composed of the summation of harmonic sinusoids, i.e., the Fourier series transformation of the drive signals required to overcome load torque disturbances. For the critically damped system of the invention, the transfer function is given by:

$$G(S) = \frac{G(S)}{T(S)} = \frac{1/J}{(S + \sqrt{K/J})^2} \quad (26)$$

from which the power spectral density is:

$$|G(jw)|^2 = G(S)G(-S)|_{s=jw} = \frac{\left[\frac{1}{J}\right]^2}{\left[\frac{K}{J} + w^2\right]^2}$$

and $$|G(jw)| = \frac{\frac{1}{J}}{\frac{K}{J} + W^2} = \frac{1}{K}\left[\frac{1}{1 + \left(\frac{w}{Wo}\right)^2}\right]$$

where as before the resonant frequency of the motor is:

$$Wo = K/J$$

(27)

With a high load inertia $J$, which produces a relatively low resonant frequency $Wo$, the attenuation of the electronically damped synchronous motor system to high frequency disturbances is significant and therefore flutter presents no stabilization problems.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. A motor control system for attenuating the short term speed perturbations imposed on a synchronous motor, said control system comprising:
    a. means for providing a reference drive signal;
    b. means coupled to the synchronous motor output for providing a signal indicative of the synchronous motor speed;
    c. means for measuring the phase difference between the reference drive signal and the synchronous motor speed signal to provide a signal indicative of the phase difference therebetween;
    d. means for differentiating the phase difference signal to provide a signal indicative of the rate of change of phase difference; and
    e. means responsive to the rate of change of the phase signal for continuously phase modulating the reference drive signal to be applied to said synchronous motor whereby the load perturbations applied to said synchronous motor are critically damped.

2. The control system as claimed in claim 1, wherein said phase modulating means phase modulates the reference drive signal according to the product of the rate of change of the phase difference and a parameter K1, said parameter set equal to 2/K/J, where K is the torque constant of said synchronous motor and J is the load inertia applied to said synchronous motor.

3. The control system as claimed in claim 2, wherein the gain of a control loop including said speed indicating means, said phase measuring means, said differentiating means and said phase modulating means is set substantially equal to K1.

4. The control system as claimed in claim 1, wherein there is included a phase shifting circuit responsive to the modulated output signal of said phase modulating means for providing in-phase and quadrature signals to be applied to the corresponding windings of said synchronous motor.

5. The control system as claimed in claim 1, wherein there is included a low pass filter interconnected between said phase measuring means and said differentiating means for removing the reference drive signal carrier from the phase difference signals.

6. The control system as claimed in claim 1, wherein said synchronous motor includes "$n$" number of motor poles and said speed indicating means is responsive to the rotation of said synchronous motor for providing "$m$" number of pulses per motor revolution, where $m$ equals one-half $n$, whereby the frequency of the synchronous motor indicating speed signal is equal to the frequency of the reference drive signal.

7. The control system as claimed in claim 1, wherein said reference drive signal means provide complimentary signals indicative of the reference drive signal, said phase modulating means responsive to the coincidence of one of said complimentary drive signals with said motor speed indicating signal for selecting as a reference the other of said reference drive signals for providing a pulse modulated signal whose duty cycle is dependent inversely upon the phase difference between the selected reference drive signal and the motor speed indicating signal.

8. The control system as claimed in claim 1, wherein said motor speed indicating means comprises an encoding disc rotatably attached to a shaft of said synchronous motor and having a plurality of "$m$" openings therein, a radiation source and a radiation detecting means responsive to the passage of radiation through said disc openings.

9. The control system as claimed in claim 8, wherein the radiation detection output means is applied to a high pass filter for removing the dc component of said radiation source.

10. The control system as claimed in claim 1, wherein said reference signal means sets the frequency of the reference drive signal at least an order of magnitude higher than the natural frequency of said synchronous motor said phase modulating means comprises a flip-flop circuit having set and reset inputs, and there is included an edge select circuit for selecting and applying the reference drive signal or its compliment to said set input to insure that the set input is high when the speed indicating signal applied to said reset input goes low.

* * * * *